(12) United States Patent
Whitehead

(10) Patent No.: US 8,385,536 B2
(45) Date of Patent: Feb. 26, 2013

(54) AUTOMATIC TELEPHONE NUMBER FAVORITES LIST

(75) Inventor: Steven D. Whitehead, Hudson, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1007 days.

(21) Appl. No.: 12/108,860

(22) Filed: Apr. 24, 2008

(65) Prior Publication Data

US 2009/0175432 A1    Jul. 9, 2009

Related U.S. Application Data

(60) Provisional application No. 61/020,144, filed on Jan. 9, 2008.

(51) Int. Cl.
    *H04M 1/00*    (2006.01)

(52) U.S. Cl. ......... 379/355.01; 379/355.02; 379/355.03; 379/355.04; 379/355.05

(58) Field of Classification Search ............... 379/355, 379/355.01–355.07, 216.01; 455/564–565, 455/556.2, 415
See application file for complete search history.

(56) References Cited

U.S. PATENT DOCUMENTS

| | | | |
|---|---|---|---|
| 5,267,308 A * | 11/1993 | Jokinen et al. | 379/354 |
| 5,568,546 A * | 10/1996 | Marutiak | 379/355.05 |
| 6,243,459 B1 * | 6/2001 | Cannon et al. | 379/356.01 |
| 6,760,431 B1 * | 7/2004 | Haimi-Cohen | 379/355.01 |
| 7,477,728 B2 * | 1/2009 | Park et al. | 379/88.03 |
| 7,773,739 B2 * | 8/2010 | Kalidindi et al. | 379/201.02 |
| 2002/0039915 A1 * | 4/2002 | Hama et al. | 455/566 |
| 2003/0126288 A1 * | 7/2003 | Tsurusaki et al. | 709/239 |
| 2003/0144952 A1 * | 7/2003 | Brown et al. | 705/40 |
| 2004/0018857 A1 * | 1/2004 | Asokan et al. | 455/564 |
| 2008/0046830 A1 * | 2/2008 | Pasquale et al. | 715/764 |
| 2008/0057926 A1 * | 3/2008 | Forstall et al. | 455/415 |
| 2008/0115047 A1 * | 5/2008 | Petri | 715/205 |

* cited by examiner

Primary Examiner — Joseph J Nguyen

(57) ABSTRACT

A system stores a set of telephone numbers dialed by a user. The system selects a subset of telephone numbers from the stored set of telephone numbers as the user's favorite telephone numbers based on one or more first scores, where the one or more scores include a frequency score associated with a frequency that the telephone numbers have been dialed by the user and/or a recency score associated with how recently that the telephone numbers have been dialed by the user. The system stores the list of the user's favorite telephone numbers in memory.

25 Claims, 9 Drawing Sheets

US 8,385,536 B2

AUTOMATIC TELEPHONE NUMBER FAVORITES LIST

CROSS REFERENCE TO RELATED APPLICATION

This application claims priority to U.S. Provisional Patent Application No. 61/020,144, filed Jan. 9, 2008, the disclosure of which is incorporated by reference herein in its entirety.

BACKGROUND

People are always looking for faster/easier ways of performing common tasks. In the case of dialing a phone number, user friendly mechanisms of "speed dialing" have been implemented that permit easier user selection and dialing of a desired telephone number. For example, when dialing a phone, it is easier to speed dial "1" than to manually the dial the complete telephone number "7814664072" that can be associated with the speed dial "1." However, a problem with speed dialing is that users must manually configure the numbers associated with the speed-dialing function (e.g., 1 ⇔ 7814664072, 2 ⇔ 9785621577, and so on). Such manual configuration tasks represent a significant barrier for most people because they have to go to the trouble of learning how to set up the speed dialing feature.

When dialing common, but less frequently used numbers than those that may be set up as speed dial phone numbers, users often look up numbers in a contact address book. This look-up process may not be particularly efficient, though, because the user may have to navigate through a long list of contacts or key in many letters to 'search' the address book for the desired contact. Users may also scan a lengthy list of numbers for recent calls received or made in order to look-up a number to call.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein keep track of numbers dialed by telephone users (e.g., mobile phone users) and augment the telephone's user interface with an automatically generated 'favorite' numbers list. This list can be used to more quickly access and dial frequently dialed numbers. Because the list is automatically generated, it does not require users to manually program/configure it. This simplifies use and encourages usage. The 'favorites' list can be used in conjunction with traditional 'speed' dial capabilities (or other dialing short-cuts) that can simplify dialing, as compared to the traditional approach of fully dialing the number. The 'favorites' list described herein, thus, gives the telephone user the ability to quickly scan a list, for example, of most commonly used phone numbers thereby providing an efficient way to retrieve and dial a desired number from a list of commonly called phone numbers. Exemplary embodiments described herein, thus, automatically create a list of commonly dialed phone numbers based on a record of a user's past dialed numbers and provide tools (e.g., dialing shortcuts and/or easy navigation) that allow those numbers to be accessed and dialed quickly.

Figure 1:
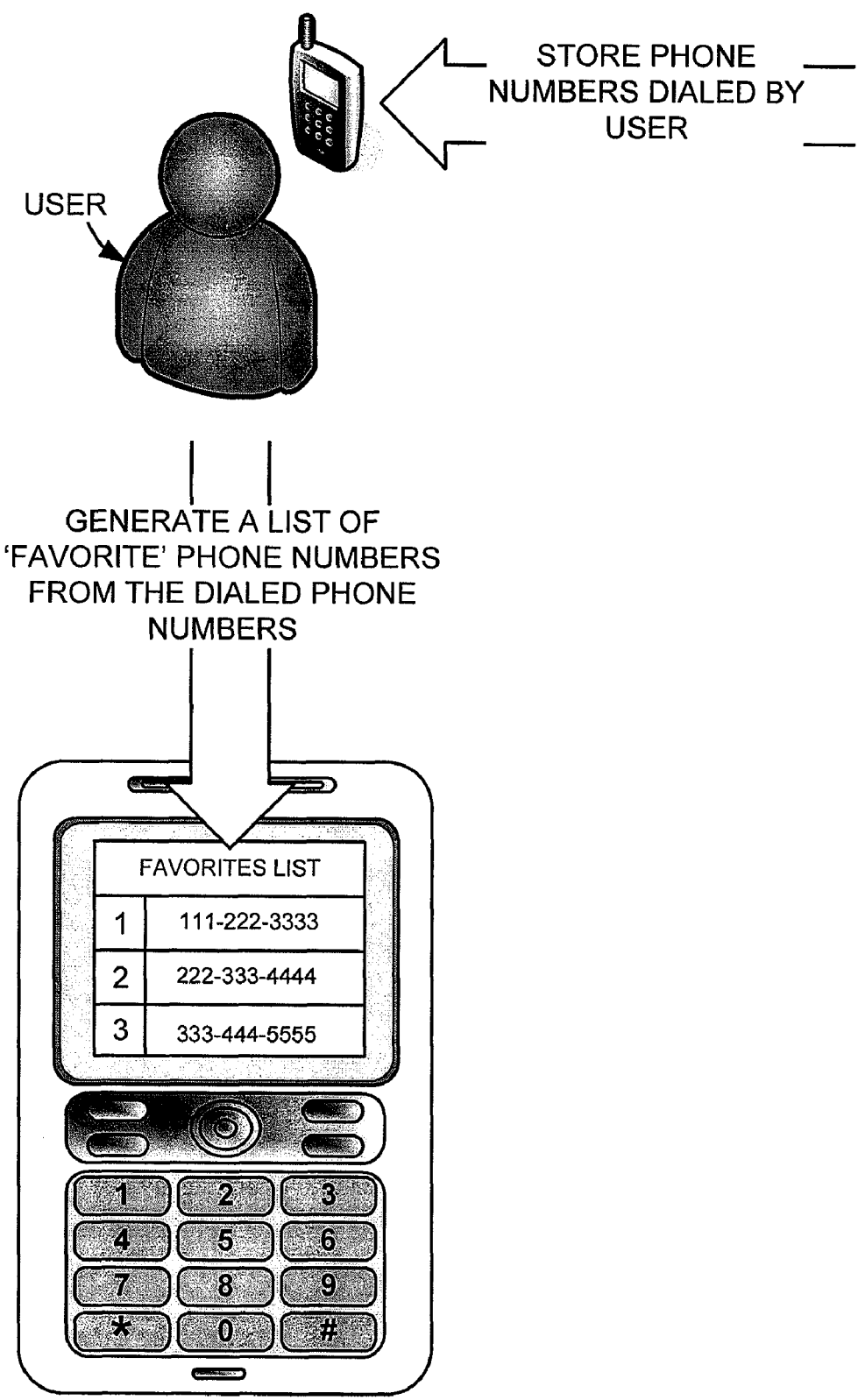
FIG. 1 is a diagram of an overview of an exemplary embodiment described herein.

FIG. 1 is a diagram of an overview of an exemplary embodiment described herein in which a telephone keeps track of, and stores, phone numbers dialed by a user over a period of time. As shown in FIG. 1, a list of 'favorite' phone numbers associated with the user may be generated. Generation of the 'favorite' phone number list may be based on one or more scores/metrics. For example, the one or more scores may include a recency component and/or a frequency component. Using a recency component as a metric/score, phone numbers dialed by the user over a period of time may be selected for inclusion in the user's 'favorite' list based on how recently each of the phone numbers was dialed. Using a frequency component as a score/metric, phone numbers dialed by the user over a period of time may be selected for inclusion in the user's 'favorite' list based on how frequently the user dialed each of the phone numbers. As further shown in FIG. 1, the generated list of 'favorite' phone numbers may be provided to the user via, for example, a user interface of the user's telephone, thus, permitting easy access and dialing of phone numbers from the 'favorite' list.

Figure 2:
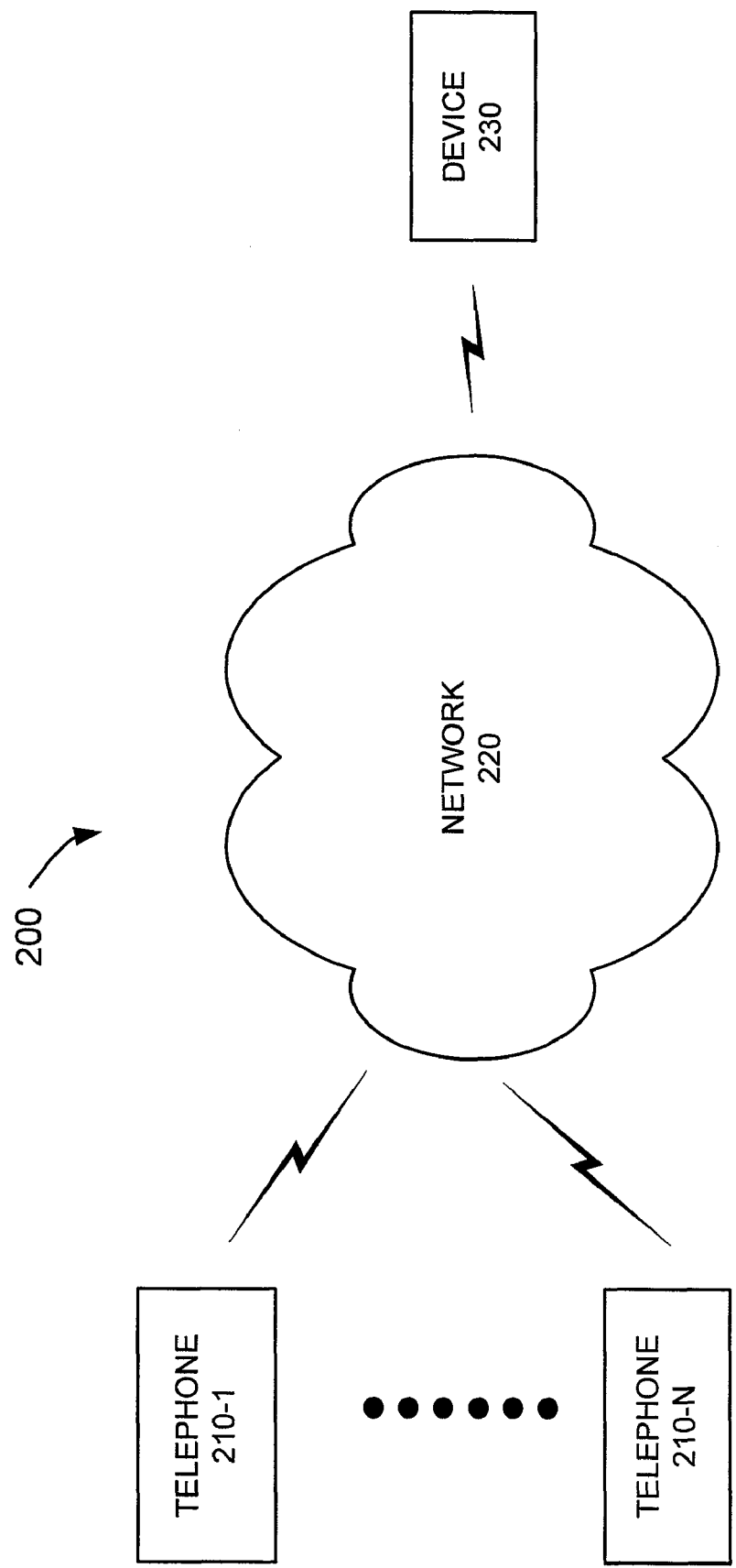
FIG. 2 is a diagram of an exemplary network that includes one or more telephones.

FIG. 2 illustrates a network 200 according to an exemplary implementation. Network 200 may include multiple telephones 210-1 through 210-N and a device 230 connected to a network 220 via wired or wireless links. Each of telephones 210-1 through 210-N may include any type of telephone device. For example, each of telephones 210-1 through 210-N may include a cellular radiotelephone, a Plain Old Telephone System (POTS) telephone, a Session Initiation Protocol (SIP) telephone, a personal digital assistant (PDA), a Personal Communications Systems (PCS) terminal, a laptop computer, a palmtop computer, or any other type of device or appliance that includes a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. One or more of telephones 210-1 through 210-N may be referred to as a "pervasive computing" device. Each of telephones 210-1 through 210-N may automatically create a user's phone number 'favorites" list, as described herein.

Network(s) 220 may include one or more networks of any type, including a local area network (LAN); a wide area network (WAN); a metropolitan area network (MAN); a telephone network, such as the Public Switched Telephone Network (PSTN) or a Public Land Mobile Network (PLMN); a satellite network; an intranet, the Internet; or a combination of networks. The PLMN(s) may further include a packet-switched network, such as, for example, General Packet Radio Service (GPRS), Cellular Digital Packet Data (CDPD), or Mobile IP network. Device 230 may include a unit external to telephones 210-1 through 210-N that may record dialed telephone numbers and may perform, entirely or in part, the exemplary process of FIG. 4 below, instead of, or in conjunction with, a respective telephone 210.

Figure 3:
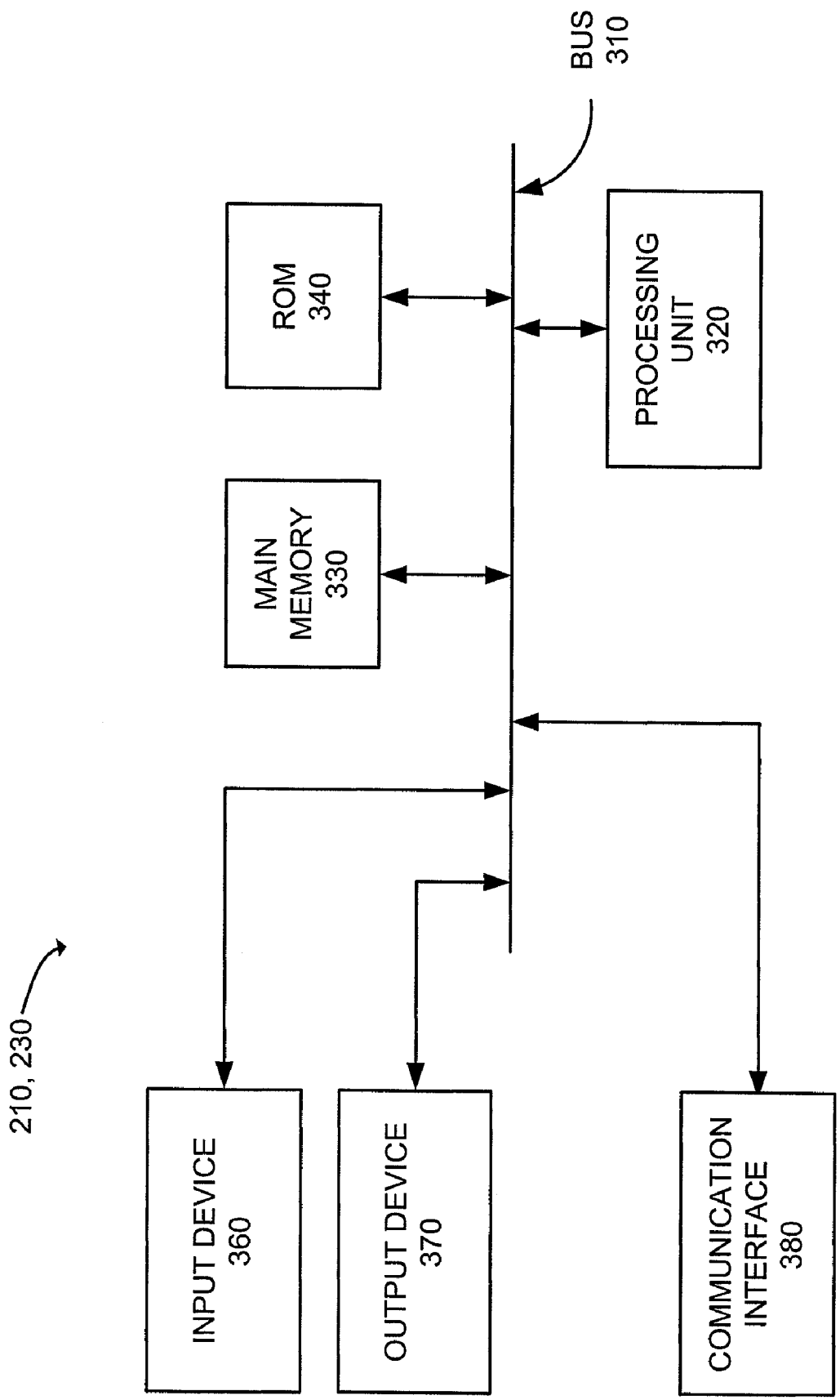
FIG. 3 is a diagram of a telephone and/or device of FIG. 2 according to an exemplary implementation.

FIG. 3 is a diagram of telephone 210 or device 230 according to an exemplary implementation. Telephone 210 and/or device 230 may include a bus 310, a processing unit 320, a main memory 330, a read only memory (ROM) 340, one or more input devices 360, one or more output devices 370, and a communication interface 380. Bus 310 may include one or more conductors that permit communication among the components of telephone 210 or device 230.

Processing unit 320 may include one or more types of processors or microprocessors that interpret and execute instructions. Main memory 330 may include a random access memory (RAM), such as, for example, volatile RAM, or another type of dynamic storage device that stores information and instructions for execution by processing unit 320. ROM 340 may include a ROM device or another type of static storage device that stores static information and instructions for use by processing unit 320 (e.g., non-volatile disk or flash memory).

Input device(s) 360 may include one or more mechanisms that permit an operator to input information to the telephone 210 or device 230, such as a keypad, voice recognition and/or biometric mechanisms, etc. Output device(s) 370 may include one or more mechanisms that output information to the user, including a display, a speaker, etc. Communication interface 380 may include any transceiver-like mechanism that enables telephone 210 or device 230 to communicate with other devices and/or systems. For example, communication interface 380 may include mechanisms for communicating with another device or system via a network, such as network 220. In one implementation, communication interface 380 may include a radio-frequency (RF) transceiver and one or more antennas for communicating with other devices via RF (e.g., a cellular radiotelephone).

As will be described in detail below, telephone 210 or device 230 may perform certain operations. Telephone 210 or device 230 may perform these operations in response to processing unit 320 executing software instructions contained in a computer-readable medium, such as memory 330. A computer-readable medium may be defined as one or more physical or logical memory devices.

The software instructions may be read into memory 330 from another computer-readable medium, or from another device via communication interface 380. The software instructions contained in memory 330 may cause processing unit 320 to perform a process that will be described later. Alternatively, hardwired circuitry may be used in place of or in combination with software instructions to implement the process described herein. Thus, implementations described herein are not limited to any specific combination of hardware circuitry and software.

Figure 4:
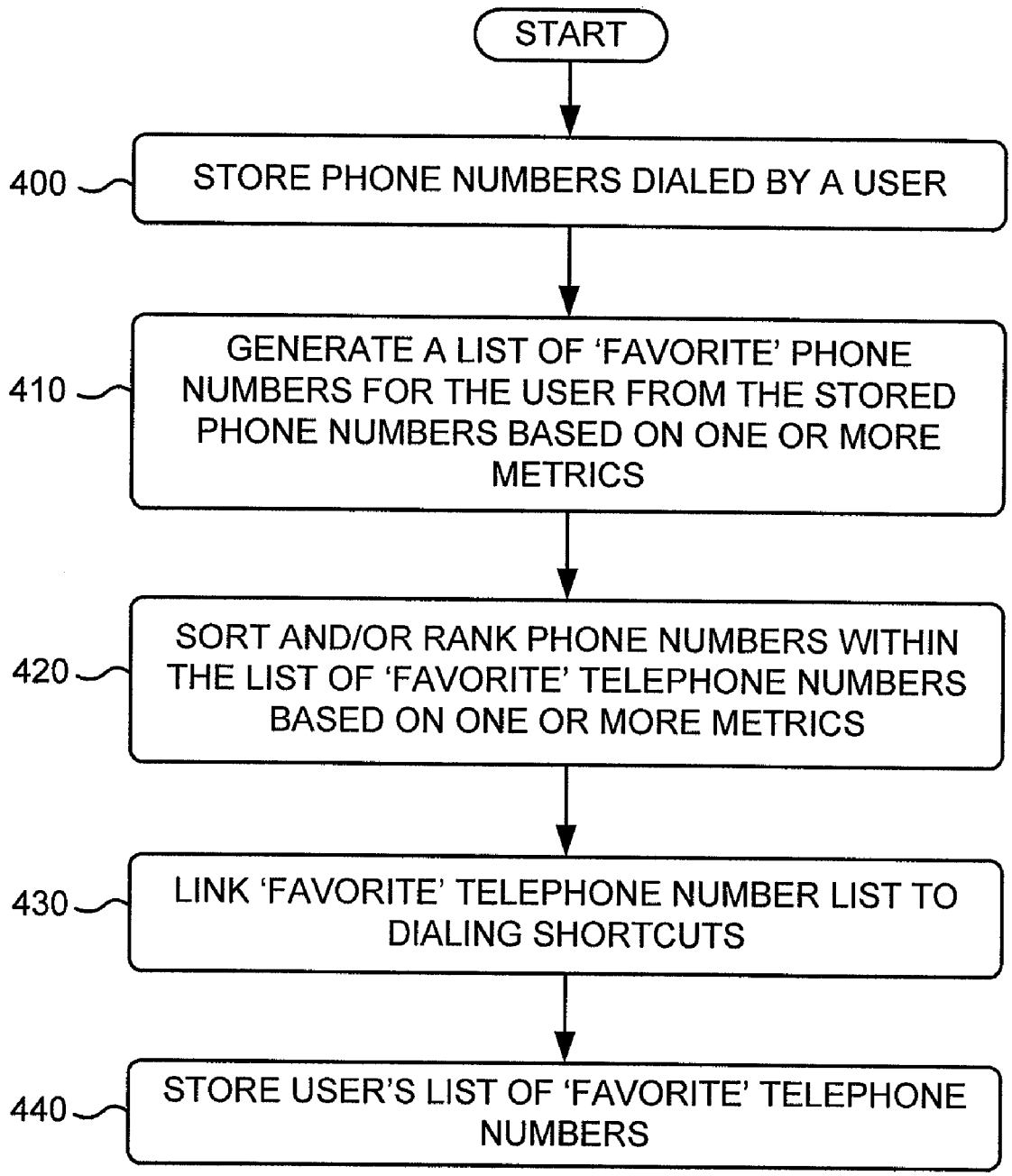
FIG. 4 is a flow diagram illustrating an exemplary process for generating a list of a user's 'favorite' phone numbers based on phone numbers that the user has dialed over a period of time.

FIG. 4 is a flow diagram illustrating an exemplary process for generating a list of a user's 'favorite' phone numbers based on phone numbers that the user has dialed over a period of time. The exemplary process of FIG. 4 may be implemented by telephone 210, by device 230, or by telephone 210 in conjunction with device 230. Each of the blocks described below may be optionally implemented in the exemplary process of FIG. 4. For example, in one exemplary embodiment, block 430 may be omitted from the process of FIG. 4.

Figure 5:
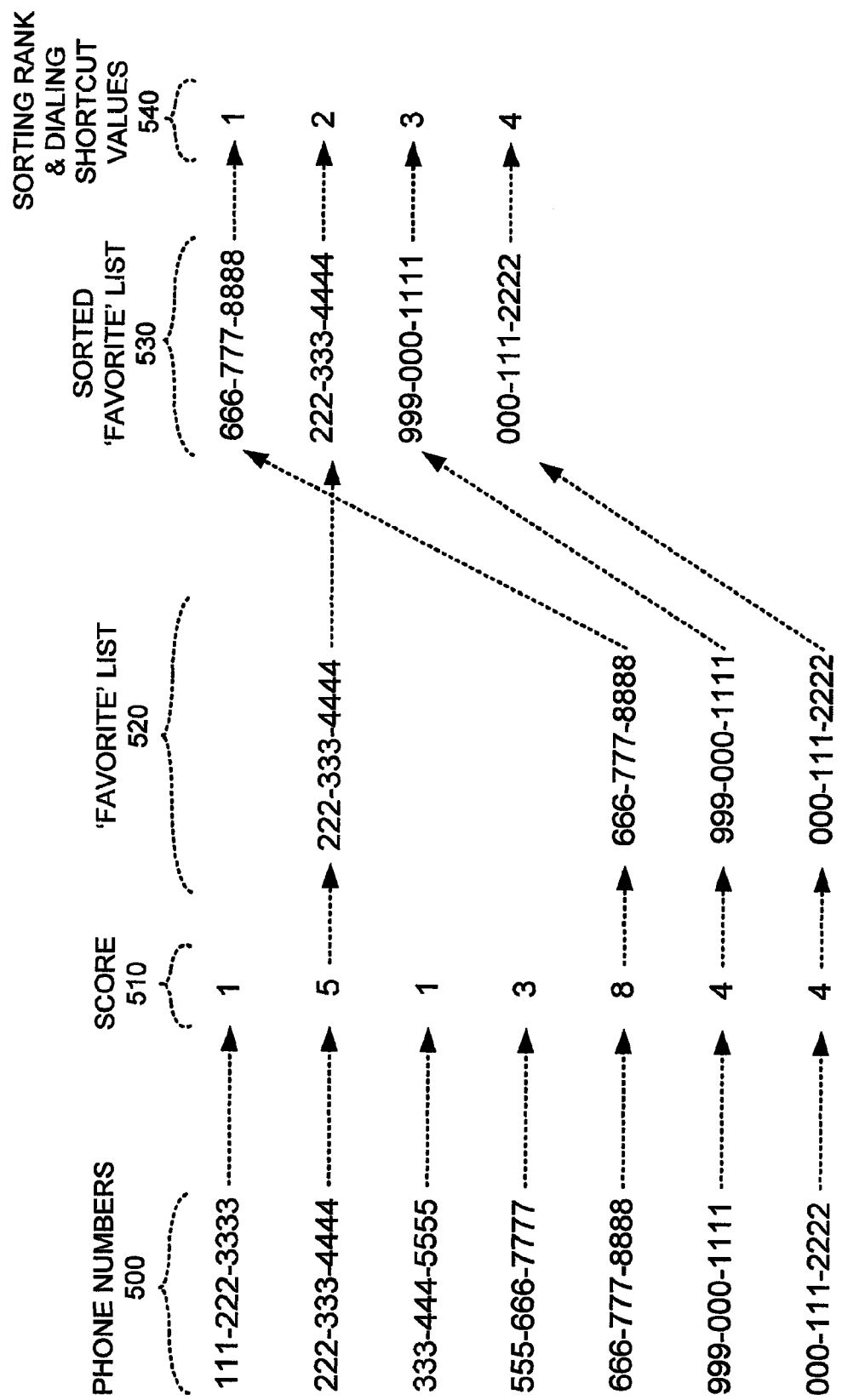
FIG. 5 is a diagram that depicts an example of the exemplary process of FIG. 4.

The exemplary process may begin with storing phone numbers dialed by a user (block 400). In one implementation, telephone 210 may maintain a record of phone numbers dialed by the user in memory 330. In another implementation, telephone 210 may send the phone numbers dialed by the user to device 230 for storage. Telephone 210 or device 230 may store phone numbers dialed over a specific period of time, or may store all phone numbers dialed by the user. As an example, FIG. 5 depicts dialed phone numbers 500 that have been stored.

A list of 'favorite' telephone numbers may be generated for the user from the stored phone numbers based on one or more scores (block 410). Telephone 210 or device 230 may analyze the stored phone numbers based on the one or more scores, such as, for example, a recency score related to how recently each phone number has been dialed or a frequency score related to how often each phone number has been dialed. Telephone 210 or device 230 may, thus, select a subset of telephone numbers from the stored telephone numbers based on the one or more scores to generate the list of 'favorite' telephone numbers. Referring to the example of FIG. 5, each of phone numbers 500 may have a score 510 associated with it based on a pre-defined metric. Each score 510 may be a recency score and/or a frequency score, or some combination thereof. Each of scores 510 may be used to select phone numbers from phone numbers 500 to include in 'favorite' list 520. For example, as shown in FIG. 5, the phone numbers with the largest of the scores 510 (e.g., 8, 5, 4 and 4) may be selected for inclusion in 'favorite' list 520. Phone number information contained in the list of 'favorite' telephone numbers may be extended to include not only each phone number, but other contact information associated with each phone number. This contact information may include a name of the party associated with a respective phone number which may be obtained, for example, via an address book or via directory services. This contact information may further include other communication address information in addition to phone numbers, such as, for example, email addresses.

The phone numbers within the list of 'favorite' telephone numbers may be sorted and/or ranked based on one or more scores (block 420). The one or more scores used to sort and/or rank the phone numbers within the 'favorite' list may be the same scores used in block 410 above, or may include different or additional scores. As an example, a recency score and/or a frequency score may be used to sort the phone numbers in "favorite' list 520. In the case of a recency score, those phone numbers dialed more recently may be sorted and placed towards the top of a list whereas phone numbers dialed less recently may be sorted and placed towards the bottom of a list. In the case of a frequency score, those phone numbers dialed more frequently may be sorted and placed towards the top of a list whereas phone numbers dialed less frequently may be sorted and placed towards the bottom of the list. Referring to the example of FIG. 5, the phone numbers of 'favorite' list 520 may be sorted such that numbers with a higher score 510 (e.g., a higher recency and/or frequency score) may be placed towards the top of sorted 'favorites' list 530 whereas the phone numbers of 'favorite' list 520 may be sorted such that numbers with a lower score 510 may be placed towards the bottom of sorted 'favorite' list 530. As shown in the example of FIG. 5, each phone number in sorted 'favorite" list 530 may have a corresponding sorting rank 540. In one implementation, the phone numbers of the 'favorites' list may be sorted alphabetically by a contact name associated with each phone number.

The list of 'favorite' telephone numbers may be linked to dialing shortcuts (block 430). The linking of the list of "favorite" telephone numbers to dialing shortcuts may be performed automatically based on each telephone number's sorted rank (e.g., sorted rank 540 of FIG. 5) or manually through user selection when the user is presented with a display of the user's 'favorite' list (e.g., sorted 'favorite' list 530 of FIG. 5). In one implementation, for example, a <n>dialing shortcut can be used to automatically dial the <n>th number in the list of 'favorite' telephone numbers. Referring to the example of FIG. 5, the sorting rank 540 may be used as a dialing shortcut 540 that may be linked to each phone number in the sorted 'favorites' list 530. Thus, the first phone number in sorted 'favorite' list 530 can be linked to the dialing shortcut, the second phone number can be linked to the dialing shortcut number <2>, etc. The user's list of 'favorite' telephone numbers may be stored (block 440). The 'favorite" list may be stored, for example, in memory 330 of telephone 210 or device 230.

The exemplary process of FIG. 5 may be selectively repeated over time such that the user's list of 'favorite' telephone numbers changes over time. Thus, as the user makes additional calls, the content of the 'favorite' list may change.

Figure 6:
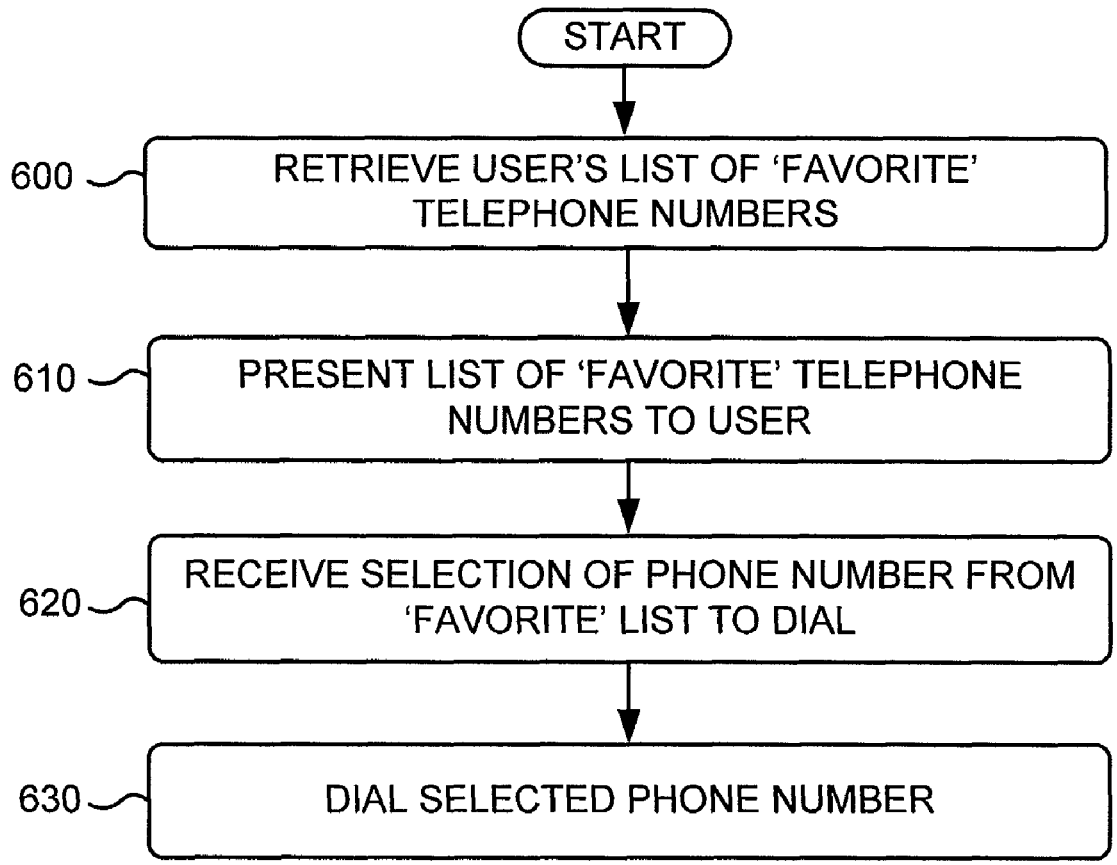
FIG. 6 is a flow diagram illustrating an exemplary process for dialing a selected phone number from a user's list of 'favorite' phone numbers.

FIG. 6 is a flow diagram illustrating an exemplary process for dialing a selected phone number from a user's list of 'favorite' phone numbers. The exemplary process of FIG. 6 may be implemented by telephone 210, possibly in conjunction with device 230.

Figure 7A:
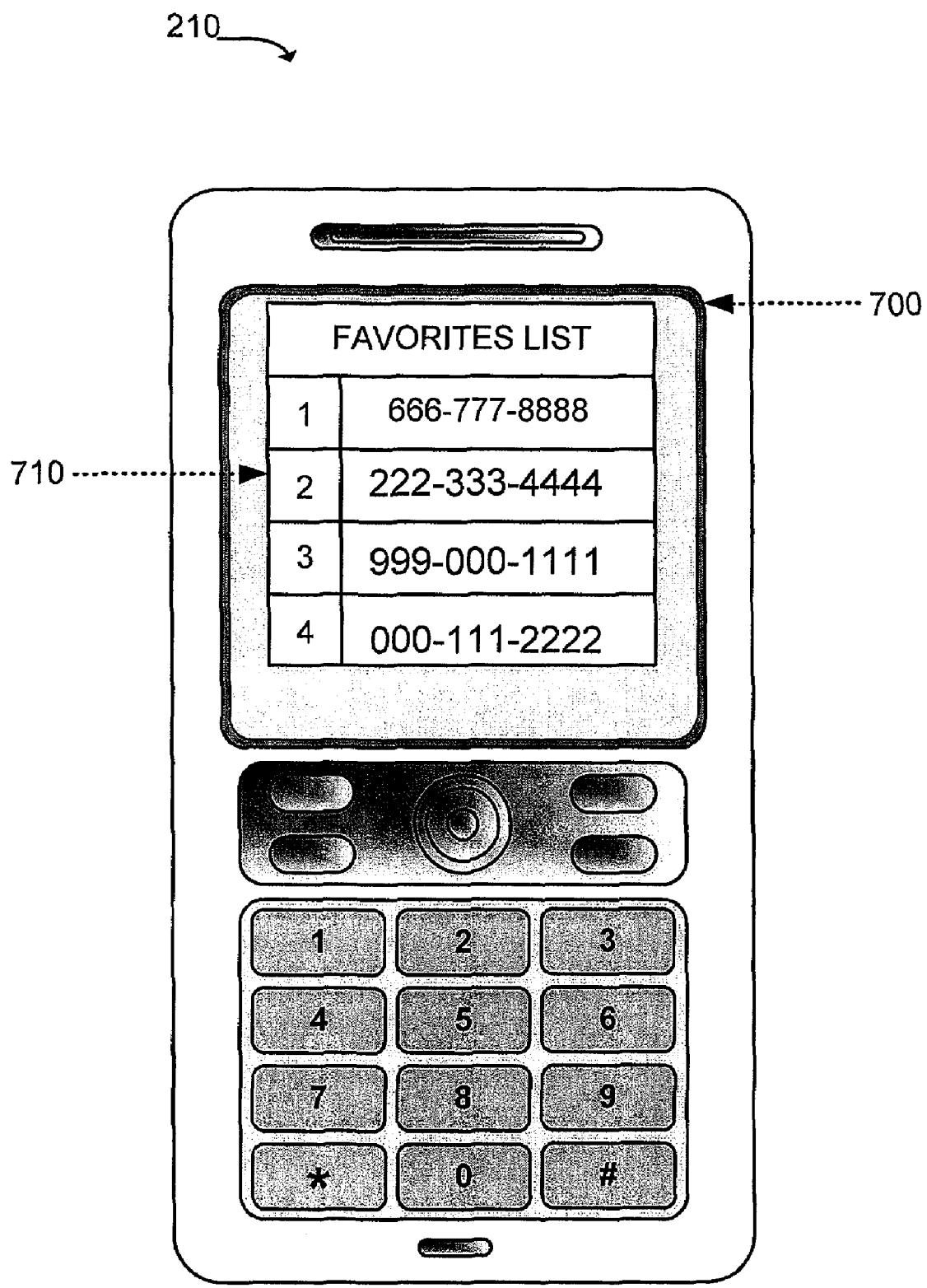
FIG. 7A is a diagram of a user's list of 'favorite' phone numbers being presented to the user via a user interface of a telephone.
Figure 7B:
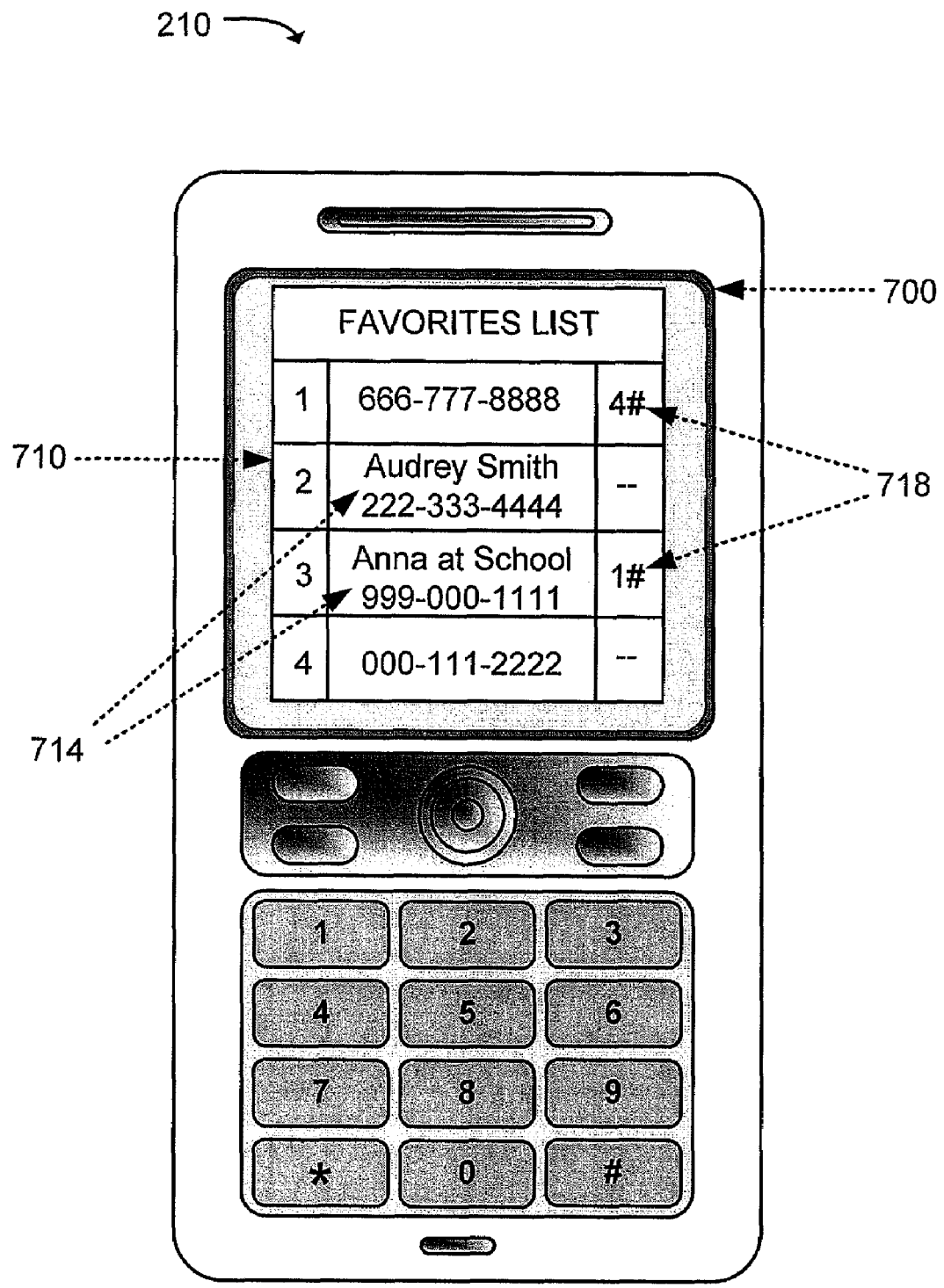
FIG. 7B is a diagram of illustrating the display of contact names and dialing shortcuts in association with one or more of the phone numbers of the user's list of 'favorite' phone numbers.
Figure 7C:
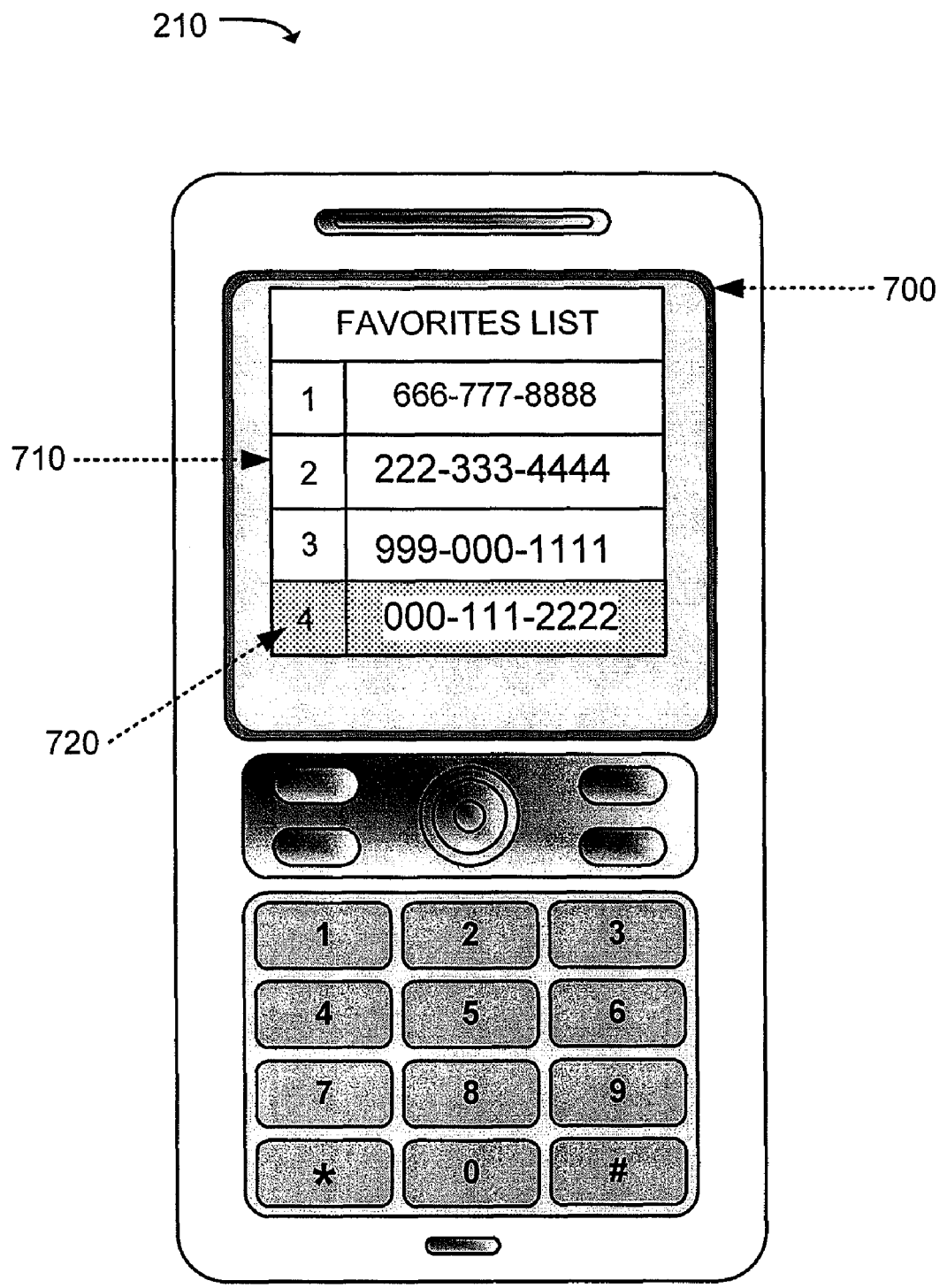
FIG. 7C is a diagram depicting user selection of a phone number from the list of 'favorite' phone numbers of FIG. 7A.

The exemplary process may begin with the retrieval of the user's list of 'favorite' telephone numbers (block 600). The user's list of 'favorite' phone numbers, generated in block 410 and/or 420 of FIG. 4, may be retrieved from memory by telephone 210, or may be retrieved from memory by device 230 and sent to telephone 210 via network 220. The list of 'favorite' telephone numbers may be presented to the user (block 610). In some implementations, the 'favorite' list may be presented to the user via a user interface of telephone 210. For example, as shown in FIG. 7A, a user interface 700 of telephone 210 may display the 'favorite' list 710 to the user. User interface 700 may additionally display contact names associated with selected ones of the phone numbers of the 'favorite list' (e.g., the name of the person associated with a respective phone number). As shown in the example of FIG. 7B, contact names 714 and 718 may be displayed in association with one or more of the phone numbers in the 'favorites' list 710 and dialing shortcuts 718 may also be displayed in association with one or more the phone numbers in 'favorites' list 710. User interface 700, in some embodiments, may include mechanisms (e.g., a user interface) permitting the user to select and/or identify dialing shortcuts associated with telephone numbers of the list of 'favorite' telephone numbers and permit the user to enter and/or edit contact information associated with the list of 'favorite' telephone numbers.

A selection of a phone number from the list of 'favorite' telephone numbers may be received (block 620). The user, via the user interface of telephone 210 or via a keypad of telephone 210, may select a phone number from the 'favorites" list. Selection of the phone number may include entering the dialing shortcut associated with a given phone number from the 'favorites' list or may include navigating up and down (e.g., scrolling through) the 'favorite' list on the user interface to select a given phone number from the 'favorite' list. For example, as shown in FIG. 7B, the user may select a phone number 720 (selection indicated by a shaded region) from 'favorite' list 710 using user interface 700. Telephone 210 may dial the selected phone number (block 630). Upon selection of a phone number from 'favorites' list, telephone 210 may dial the selected phone number for establishing a call to another party via network 220.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of blocks has been described with regard to FIGS. 4 and 6, the order of the blocks may be modified in other implementations consistent with the principles of the invention. Further, non-dependent blocks may be performed in parallel. Exemplary embodiments herein have been described as using a user's dialed telephone numbers for generating a 'favorites' list of telephone numbers. However, a user's received telephone numbers (numbers of calling parties who have called the user) may alternatively, or in combination with the user's dialed telephone numbers, be used when generating the user's 'favorites' list of telephone numbers. The received telephone numbers may include the numbers of all parties who have called the user or only those numbers associated with calls that the user has actually answered (i.e., telephone numbers associated with received calls that the user doesn't answer may excluded from the 'favorites" list).

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
   storing, by a device, a first set of telephone numbers dialed by a user using another device;
   storing, by the device, a second set of telephone numbers associated with a plurality of calls that are received by the other device;
   selecting, by the device, a first subset of telephone numbers, from the stored first set of telephone numbers, as favorite telephone numbers of the user, the first subset of telephone numbers being selected based on one or more first scores associated with telephone numbers in the first set of telephone numbers, each telephone number, in the first set of telephone numbers, being associated with a corresponding first score of the one or more first scores, and each first score, of the one or more first scores, being based on:

a frequency of calls associated with a corresponding telephone number in the first set of telephone numbers, and a recency of calls associated with the corresponding telephone number;

selecting, by the device, a second subset of telephone numbers from the stored second set of telephone numbers, the second subset of telephone numbers corresponding to one or more calls, of the plurality of calls, that are answered by the user, calls, of the plurality of calls, that are not answered by the user being excluded by the device;

including, by the device, the second subset of telephone numbers in the favorite telephone numbers;

presenting, by the device, the favorite telephone numbers to the user, the favorite telephone numbers being stored in a memory, each telephone number, in the favorite telephone numbers, being linked to a different one of a plurality of dialing shortcuts, and the plurality of dialing shortcuts including different identification information associated with a corresponding telephone number in the favorite telephone numbers; and dialing a particular telephone number, in the favorite telephone numbers, to initiate a call when selection of identification information of a particular dialing shortcut, of the plurality dialing shortcuts, is detected, the identification information of the particular dialing shortcut corresponding to the particular telephone number.

2. The method of claim 1, where each telephone number, in the second subset of telephone numbers, is associated with a corresponding one of one or more second scores, and where including the second subset of telephone numbers in the favorite telephone numbers comprises:

including, based on the one or more second scores, the second subset of telephone numbers in the favorite telephone numbers.

3. The method of claim 1, where the one or more first scores comprise one or more frequency scores, and where each frequency score, of the one or more frequency scores, is associated with a frequency of the user dialing a corresponding telephone number of the first set of telephone number.

4. The method of claim 1, where the one or more first scores comprise one or more recency scores, and where a recency score, of the one or more recency scores, is associated with a recency of the user dialing a corresponding telephone number of the first set of telephone numbers.

5. The method of claim 1, where presenting the favorite telephone numbers to the user comprises:

retrieving the favorite telephone numbers from the memory; and presenting the retrieved favorite telephone numbers, to the user, via a user interface.

6. The method of claim 5, further comprising:

detecting selection, via the user interface, of the particular telephone number; and dialing the selected particular telephone number to initiate a call, based on detecting the selection of the particular telephone number.

7. The method of claim 1, further comprising:

at least one of:

sorting telephone numbers in the favorite telephone numbers, or ranking the telephone numbers in the favorite telephone numbers; and presenting the at least one of the sorted telephone numbers or the ranked telephone numbers to the user.

8. The method of claim 7, further comprising:

obtaining contact names associated with each of the telephone numbers in the favorite telephone numbers; and sorting the telephone numbers in the favorite telephone numbers, where sorting the telephone numbers in the favorite telephone numbers includes sorting the telephone numbers based on the obtained contact names.

9. The method of claim 7, where sorting the telephone numbers in the favorite telephone numbers or ranking the telephone numbers in the favorite telephone numbers is based on the one or more first scores.

10. The method of claim 1, further comprising:

linking each telephone number, in the favorite telephone numbers, to a different one of the plurality of dialing shortcuts, and where presenting the favorite telephone numbers to the user comprises displaying one or more telephone numbers, in the favorite telephone numbers, with a corresponding one of the plurality of dialing shortcuts.

11. The method of claim 1, further comprising:

detecting selection of the particular telephone number; and dialing the particular telephone number to initiate a call, based on detecting the selection of the particular telephone number.

12. A system, comprising:

a memory to store instructions;

a processing unit to execute the instructions to:

store a first set of telephone numbers dialed by a device of a user, store a second set of telephone numbers associated with a plurality of calls that are received by the device of the user, select a first subset of telephone numbers, from the stored first set of telephone numbers, to include in a first list of telephone numbers, the first subset of telephone numbers being selected based on one or more first scores associated with telephone numbers in the first set of telephone numbers, each telephone number, of the first set of telephone numbers, being associated with a corresponding first score of the one or more first scores, and each first score, of the one or more first scores, being based on:

a frequency of calls associated with a corresponding telephone number in the first set of telephone numbers, and a recency of calls associated with the corresponding telephone number, select a second subset of telephone numbers, from the stored second set of telephone numbers, to include in a second list of telephone numbers, the second subset of telephone numbers corresponding to one or more calls, of the plurality of calls, that are answered by the user, one or more calls, of the plurality of calls, that are not answered by the user being excluded by the processing unit, each telephone number, in the second subset of telephone numbers, being selected based on a second score that is based on:
- a frequency of calls associated with the telephone number in the second subset of telephone numbers, and
- a recency of calls associated with the telephone number in the second subset of telephone numbers, link each telephone number, in the first list of telephone numbers and the second list of telephone numbers, to a corresponding one of a plurality of different dialing shortcuts, the plurality of different dialing shortcuts comprising different identification information associated with each telephone number in the first list of telephone numbers and the second list of telephone numbers, provide, for display to the user, the first list of telephone numbers, the second list of telephone numbers, and the plurality of different dialing shortcuts, and initiate dialing of a particular telephone number, from the presented first list of telephone numbers or the presented second list of telephone numbers, to initiate a call when:
- selection of the particular telephone number is detected, or
- selection of identification information associated with a dialing shortcut, of the plurality of different dialing shortcuts, corresponding to the particular telephone number is detected.

13. The system of claim 12, further comprising:
a user interface to:
display at least one telephone number, from at least one of the first list of telephone numbers or the second list of telephone numbers, in association with at least one corresponding dialing shortcut of the plurality of dialing shortcuts, and
enable the user to edit one or more of:
the at least one telephone number,
the at least one corresponding dialing shortcut, or
contact information associated with the at least one telephone number.

14. The system of claim 13, where the processing unit is further to obtain contact information associated with the at least one telephone number,
where the contact information includes email address information of a user associated with the at least one telephone number, and
where the user interface is to display the at least one telephone number, the contact information including the email address information, and the at least one corresponding dialing shortcut.

15. The system of claim 12, where the memory and the processing unit are included in another device that is connected to the device via a network, the other device being different than the device, and
where the processing unit is further to:
receive information associated with the telephone numbers, in the first set of telephone numbers, from the device via the network,
where the received information associated with the telephone numbers, in the first set of telephone numbers, includes the one or more first scores, and
where the processing unit is to select the first subset of telephone numbers, from the first set of telephone numbers, based on the received information associated with the telephone numbers.

16. The system of claim 12, further comprising:
a user interface device to:
present the first list of telephone numbers and the second list of telephone numbers to the user, and
detect the selection of a telephone number from the presented first list of telephone numbers or the presented second list of telephone numbers.

17. The system of claim 12, where the processing unit is further to at least one of:
sort telephone numbers in the first list of telephone numbers and the second list of telephone numbers, or
rank the telephone numbers in the first list of telephone numbers and the second list of telephone numbers, and
the system further comprising:
a user interface device to provide, to the user, the at least one of the sorted telephone numbers or the ranked telephone numbers.

18. The system of claim 17, where the processing unit is further to:
obtain contact names associated with each of the telephone numbers in the first list of telephone numbers and the second list of telephone numbers, and
sort the telephone numbers, in the first list of telephone numbers and the second list of telephone numbers, based on the obtained contact names.

19. A non-transitory computer-readable medium for storing instructions, the instructions comprising:
one or more instructions which, when executed by at least one processor, cause the at least one processor to store a first plurality of telephone numbers dialed by a user;
one or more instructions which, when executed by the at least one processor, cause the at least one processor to store a second plurality of telephone numbers associated with a plurality of calls that are received by a device of the user;
one or more instructions which, when executed by the at least one processor, cause the at least one processor to select one or more first telephone numbers from the first plurality of telephone numbers based on a plurality of scores associated with the first plurality of telephone numbers,
each first telephone number of the first plurality of telephone numbers being associated with a corresponding score of the plurality of scores, and
each score, of the plurality of scores, being based on at least one of:
a frequency of the user dialing a corresponding one of the first plurality of telephone numbers, or
a recency of the user dialing the corresponding one of the first plurality of telephone numbers;
one or more instructions which, when executed by the at least one processor, cause the at least one processor to select one or more second telephone numbers from the second plurality of telephone numbers, the one or more second telephone numbers corresponding to one or more calls, of the plurality of calls, that are answered by the user;
one or more instructions which, when executed by the at least one processor, cause the at least one processor to obtain contact information of a particular user associated with a particular telephone number of the one or more first telephone numbers or the one or more second telephone numbers, the contact information being different than the particular telephone number, the particular telephone number being linked to a particular dialing shortcut of a plurality of dialing shortcuts, and the particular dialing shortcut including particular identification information;

one or more instructions which, when executed by the at least one processor, cause the at least one processor to provide, to the user, the one or more first telephone numbers, the one or more second telephone numbers, the particular dialing shortcut, and the contact information;

one or more instructions which, when executed by the at least one processor, cause the at least one processor to detect selection of the particular telephone number; and one or more instructions, which when executed by the at least one processor, cause the at least one processor to dial the selected particular telephone number to establish a call with a particular device of the particular user.

20. The non-transitory computer-readable medium of claim 19, where the contact information includes email address information associated with the particular user, the instructions further comprising:

one or more instructions to display the particular telephone number, the contact information including the email address information, and the particular dialing shortcut.

21. The non-transitory computer-readable medium of claim 19, where each second telephone number, in the second plurality of telephone numbers, is associated with a corresponding one of a plurality of second scores, and where the one or more instructions to select the one or more second telephone numbers comprise:

one or more instructions to select the one or more second telephone numbers based on the plurality of second scores.

22. The non-transitory computer-readable medium of claim 19, the instructions further comprising:

one or more instructions to obtain contact names associated with the one or more first telephone numbers and the one or more second telephone numbers;

one or more instructions to sort the one or more first telephone numbers and the one or more second telephone numbers based on the obtained contact names; and one or more instructions to present, to the user, the sorted one or more first telephone numbers and the sorted one or more second telephone numbers, the obtained contact names, and information identifying a location associated with at least one telephone number of the sorted one or more first telephone numbers and the sorted one or more second telephone numbers.

23. The non-transitory computer-readable medium of claim 19, where the one or more instructions to select the one or more first telephone numbers from the first plurality of telephone numbers include:

one or more instructions to select the one or more first telephone numbers, from the first plurality of telephone numbers, based on each score of the plurality of scores exceeding a particular threshold.

24. The non-transitory computer-readable medium of claim 19, the instructions further comprising:

one or more instructions to rank the one or more first telephone numbers based on the plurality of scores; and, one or more instructions to provide, to the user, the ranked one or more first telephone numbers.

25. The non-transitory computer-readable medium of claim 24, where the corresponding score, of the plurality of scores, of a first one of the ranked one or more first telephone numbers is higher than other scores of the plurality of scores.

* * * * *